US012759481B1

(12) United States Patent
Jarrett

(10) Patent No.: US 12,759,481 B1
(45) Date of Patent: Oct. 13, 2026

(54) VEHICLE DASH COVER ASSEMBLY AND METHOD FOR TEMPORARILY COVERING A VEHICLE DASH

(71) Applicant: Christina Lock Jarrett, Taylorsville, NC (US)

(72) Inventor: Christina Lock Jarrett, Taylorsville, NC (US)

( * ) Notice: Subject to any disclaimer, the term of this patent is extended or adjusted under 35 U.S.C. 154(b) by 402 days.

(21) Appl. No.: 18/242,286

(22) Filed: Sep. 5, 2023

Related U.S. Application Data

(60) Provisional application No. 63/403,524, filed on Sep. 2, 2022.

(51) Int. Cl.
*B60R 13/02* (2006.01)
*B60J 11/00* (2006.01)
*B60J 11/06* (2006.01)

(52) U.S. Cl.
CPC ........... *B60R 13/0256* (2013.01); *B60J 11/00* (2013.01); *B60J 11/06* (2013.01); *B60R 13/0206* (2013.01)

(58) Field of Classification Search
CPC . B62D 25/14; B60R 13/0206; B60R 13/0256; B60R 13/0287; B60R 2021/024; B60R 21/045; B60J 11/00; B60J 11/06
USPC .... 296/39.1, 70, 37.12, 136.1, 136.07, 95.1, 296/78.1, 81; D12/192, 221
See application file for complete search history.

(56) References Cited

U.S. PATENT DOCUMENTS

| | | | | | |
|---|---|---|---|---|---|
| 4,659,144 | A * | 4/1987 | Reese | B60J 1/2011 160/370.21 |
| D303,783 | S * | 10/1989 | Engolia | D12/192 |
| 5,100,194 | A * | 3/1992 | Decker | B60J 1/2011 160/370.21 |
| 5,458,390 | A * | 10/1995 | Gilbert | B62J 17/065 296/78.1 |
| 5,562,142 | A * | 10/1996 | Ziel | B60J 1/2013 160/180 |
| 11,358,459 | B1 * | 6/2022 | Miller | B60J 1/2047 |
| 11,577,608 | B2 * | 2/2023 | Martinez | B60R 13/0256 |
| D984,338 | S * | 4/2023 | Foerster | D12/191 |
| 2023/0030525 | A1 * | 2/2023 | Henry | B60J 11/00 |

FOREIGN PATENT DOCUMENTS

| | | | | |
|---|---|---|---|---|
| ES | 1077845 U | * 10/2012 | | B62J 17/086 |

* cited by examiner

*Primary Examiner* — Amy R Weisberg
*Assistant Examiner* — Denise L. Esquivel
(74) *Attorney, Agent, or Firm* — Schwartz Law Firm, P.C.

(57) ABSTRACT

A vehicle dash cover assembly temporarily covers and protects a dash of a vehicle. The dash cover assembly incorporates a waterproof flexible cover and fasteners for releasably securing the waterproof flexible cover in position over the dash during operation of the vehicle. The waterproof flexible cover includes a transparent cover inset configured to substantially align with an instrument panel and head unit of the vehicle, such that the transparent cover inset allows a driver to readily view the instrument panel and to interface with controls of the head unit while driving.

18 Claims, 8 Drawing Sheets

VEHICLE DASH COVER ASSEMBLY AND METHOD FOR TEMPORARILY COVERING A VEHICLE DASH

TECHNICAL FIELD AND BACKGROUND OF THE DISCLOSURE

The present disclosure relates broadly and generally to a vehicle dash cover assembly and method for temporarily covering the interior dash of a vehicle. In exemplary embodiments, the dash cover assembly is applicable for use on Jeep Wrangler® vehicles (years 2007-present), Ford Bronco® vehicles (years 2022-2023), and other topless and convertible vehicles.

The size of the exemplary dash cover assembly readily adjusts to accommodate each different make and model of vehicle. In other embodiments, the dash cover assembly may be used on other vehicles including, for example, watercraft, golf carts, ATVs, UTVs, lawn tractors, and others. When deployed in position over the dash, the present cover assembly shields and protects the vehicle interior, climate control vents, electrical components and entertainment system-allowing the vehicle to be driven (in moving operation), with the top and doors removed, in the rain and in other adverse weather conditions. The dash cover assembly also shields and protects the vehicle interior when four-wheeling or off-roading through mud, streams, and other such environments, and may also be used to shield and protect the interior dash when washing the vehicle, and to help keep the dash free of dust. The dash cover assembly may also protect the vehicle from various sources of potential damage, such as sunlight/UV radiation, heat, and even minor impacts. By preserving the vehicle dashboard, a present dash cover assembly can potentially extend the lifespan of the vehicle's interior components, helping maintain the aesthetics of the vehicle and improve its overall resale value.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a vehicle dash cover assembly for temporarily covering and protecting a dash (or "dashboard") of a vehicle. The dash cover assembly incorporates a waterproof flexible cover and means for releasably securing the waterproof flexible cover in position over the dash during operation of the vehicle. The waterproof flexible cover includes a transparent cover inset configured to substantially align with an instrument panel and head unit of the vehicle, such that the transparent cover inset allows a driver to readily view the instrument panel and to interface with controls of the head unit while driving.

As used herein, the term "waterproof" means sufficiently resistant to water penetration to avoid damage to underlying surfaces and components. The term "transparent" means sufficiently see-through by the naked eye to view underlying displays of the instrument panel, and to view and operate underlying controls of the automotive head unit.

According to another exemplary embodiment, the waterproof flexible cover further comprises a plurality of translucent cover sections residing directly adjacent the transparent cover inset. The term "translucent" refers to material which reflects and absorbs some light, but which also allows light to pass through. In the exemplary embodiment, the cover sections reflect and absorb more light than the transparent cover inset. In other exemplary embodiments, the cover sections are opaque.

According to another exemplary embodiment, the translucent sections comprise a top cover section, a front cover section, and opposing side cover sections According to another exemplary embodiment, the transparent cover inset resides directly adjacent the front cover section on at least 4 sides of the transparent cover inset.

According to another exemplary embodiment, the transparent cover inset is removably attached to the front cover section.

According to another exemplary embodiment, the transparent cover inset and the front cover section comprise complementary hook and loop fasteners.

According to another exemplary embodiment, the top cover section has opposing speaker flaps configured to align with respective speakers of the vehicle.

According to another exemplary embodiment, the front cover section comprises an airbag release flap configured to align with a safety airbag of the vehicle.

According to another exemplary embodiment, the front cover section and the transparent cover inset cooperate to form a steering column cutout configured to accommodate a steering column of the vehicle.

According to another exemplary embodiment, the transparent cover inset comprises a clear vinyl material incorporating a flame retardant finish and UV inhibitor.

According to another exemplary embodiment, the means for releasably securing the waterproof flexible cover in position comprises a plurality of fasteners spaced apart along a perimeter edge of the waterproof flexible cover and adapted for engaging the vehicle adjacent the dash.

In another exemplary embodiment, the present disclosure comprises a dash cover assembly incorporating an unfitted (e.g., loosely fitted) waterproof flexible cover with a plurality of spaced apart fasteners. The waterproof flexible cover has a translucent front cover section and a transparent cover inset. The transparent cover inset resides directly adjacent the translucent front cover section on at least 4 sides of the transparent cover inset. The transparent cover inset is configured to substantially align with an instrument panel and head unit of the vehicle, such that the transparent cover inset allows a driver to readily view the instrument panel and to interface with controls of the head unit while driving. The fasteners are spaced apart along a perimeter edge of the waterproof flexible cover and are adapted for engaging the vehicle adjacent the dash, thereby releasably securing the waterproof flexible cover in position during operation of vehicle.

In yet another exemplary embodiment, the present disclosure comprises a method utilizing a vehicle dash cover assembly for temporarily covering and protecting a dash of a vehicle. The method includes aligning a flexible transparent cover inset of the vehicle dash cover assembly with an instrument panel and head unit of the vehicle, such that the transparent cover inset allows a driver to readily view the instrument panel and to interface with controls of the head unit while driving. The dash cover assembly is releasably secured in position over the dash of the vehicle during operation of vehicle.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
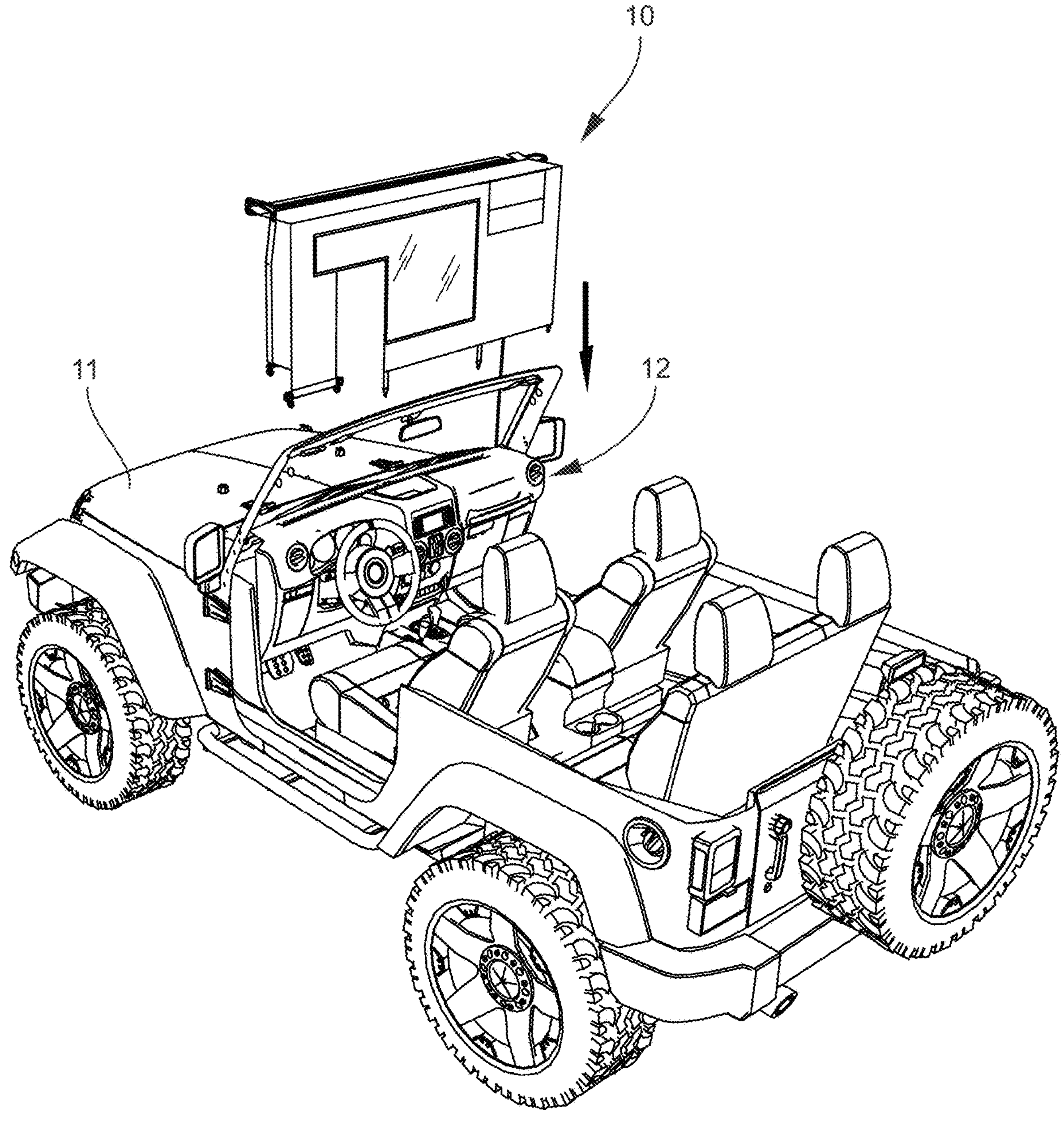
FIGS. 1 and 2 are perspective views of the present dash cover assembly applicable for use on a convertible vehicle, such as a Jeep Wrangler® compact SUV.
Figure 2:
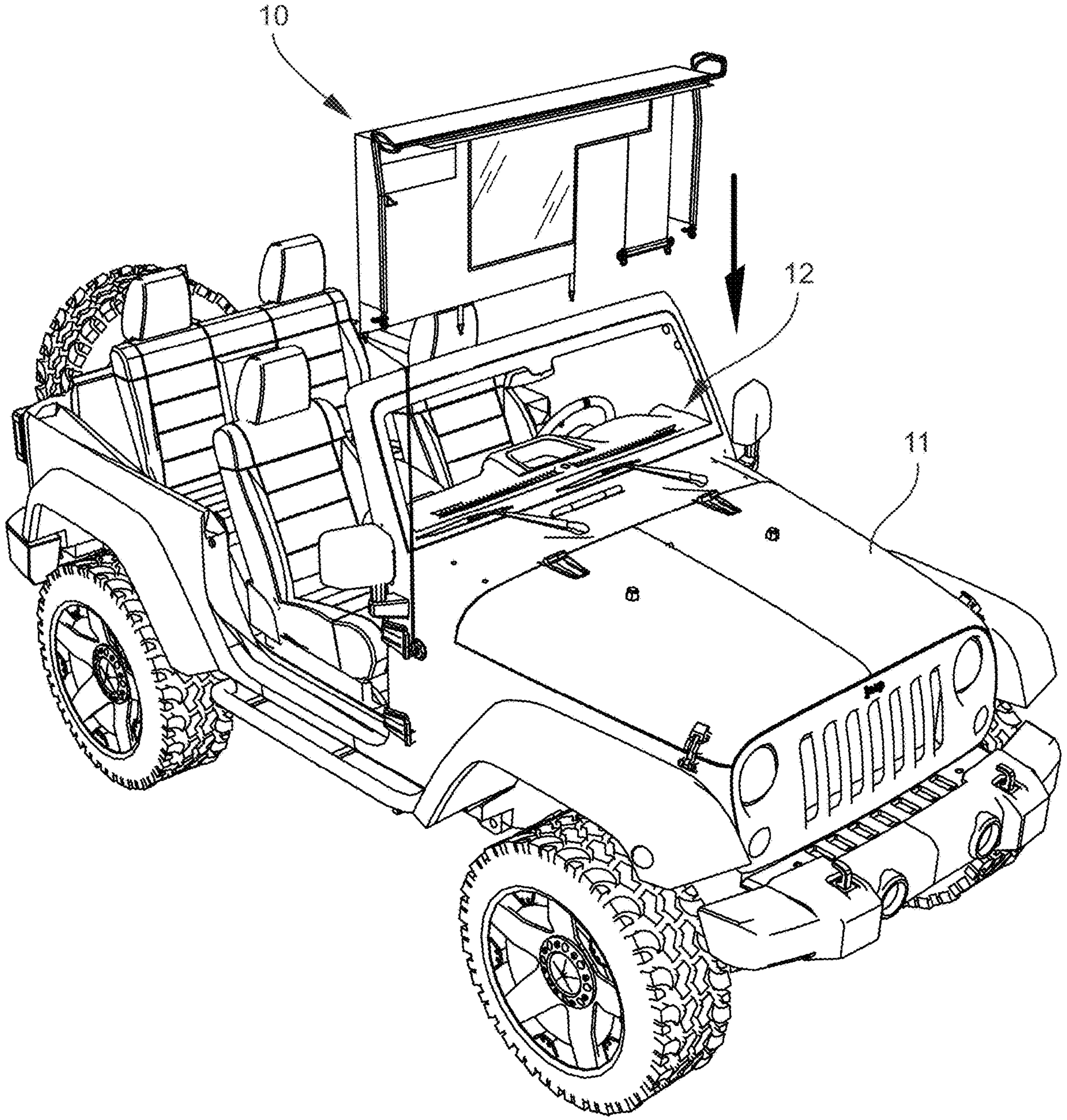
Figure 3:
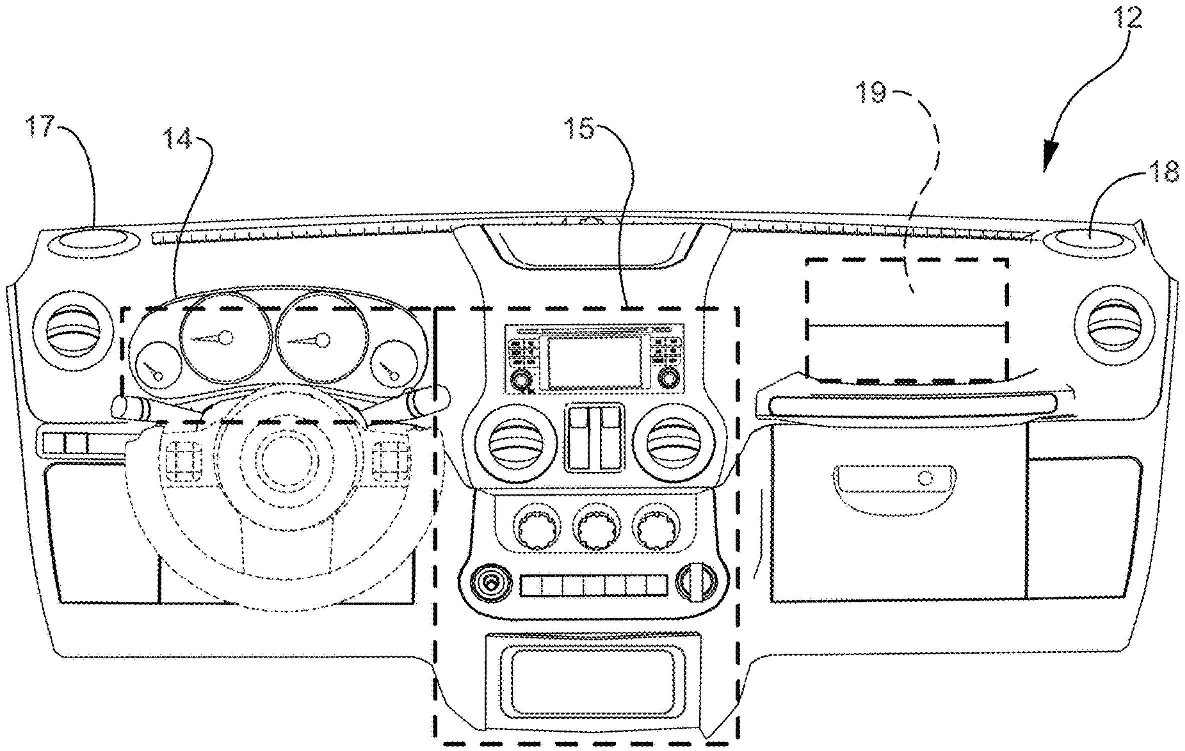
FIG. 3 shows a dashboard of the convertible vehicle.
Figure 4:
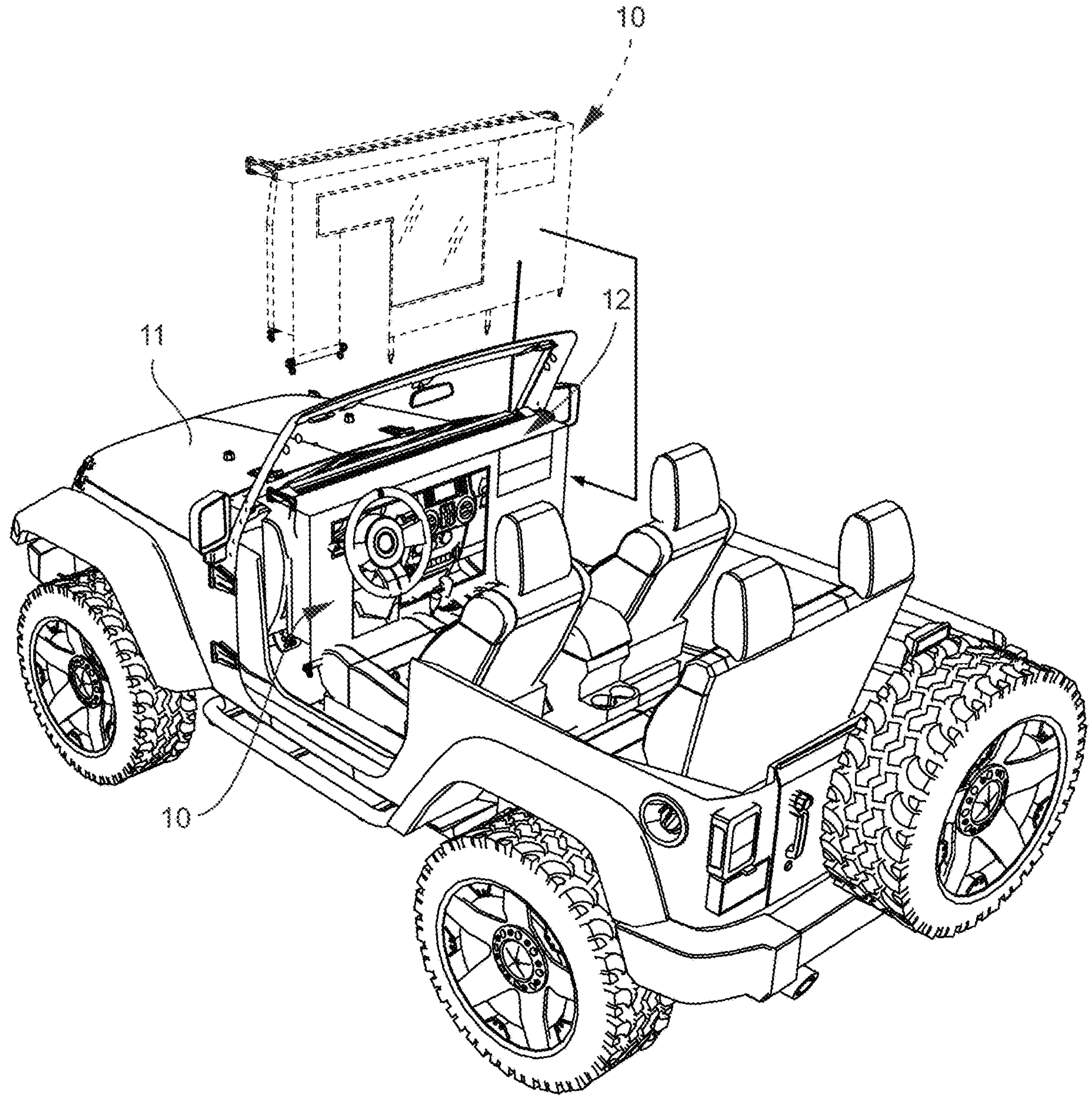
FIG. 4 shows the exemplary dash cover assembly applied to the dashboard of the convertible vehicle.

Referring now specifically to the drawings, a vehicle dash cover assembly according to one exemplary embodiment of the present disclosure is illustrated in FIGS. 1 and 2, and shown generally at broad reference number 10. The exemplary dash cover assembly 10 is especially applicable for use in a convertible vehicle 11 which features a retractable roof, or a roof which can be folded down and removed partially or entirely. FIGS. 1, 2 and 4 show the present dash cover assembly configured for use in a Jeep Wrangler® compact SUV, although the concepts disclosed herein are equally applicable to other types of convertible and topless vehicles. As best shown in FIG. 3, the dashboard 12 of the exemplary vehicle 11 incorporates standard features, electronics and hardware including an instrument panel 14, automotive head unit 15 (or "infotainment system"), dash top-mount speakers 17, 18 and a passenger side airbag 19.

The instrument panel 14 typically comprises the speedometer, tachometer, odometer, fuel gauge, gear display, turn signal indicators, and active system lights—each if which must remain visible to the driver while operating the vehicle 11. The automotive head unit 15 is located adjacent the instrument panel 14 and provides a unified interface for the vehicle's information and entertainment media components, such as AM/FM radio, satellite radio, audio functions and control, USB ports, auxiliary power outlets, dashcams, GPS navigation and video screen, and Bluetooth and Wi-Fi technology. When installed, as shown in FIG. 4, the present dash cover assembly 10 is designed to temporarily cover and protect substantially the entire dashboard 12 of the vehicle 10, and without compromising the utility, function and user control of certain integrated components; namely, the instrument panel 14, automotive head unit 15, dash speakers 17, 18 and safety airbag 19. By remaining in place while driving the vehicle 11, the dash cover assembly 10 shields the integrated dash components from sudden rain, splashing water, mud and debris, and other outside environmental conditions.

Figure 5:
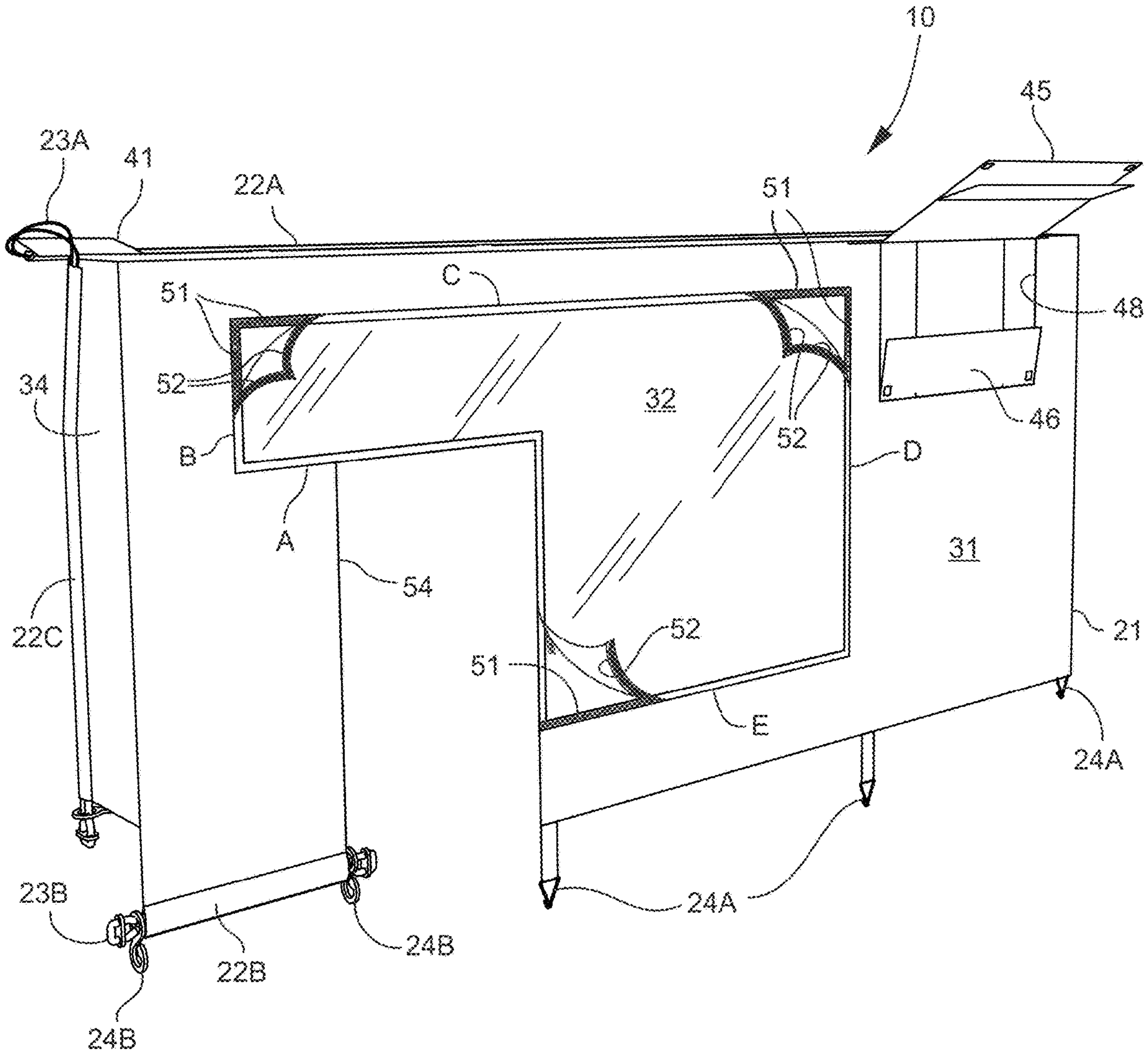
FIGS. 5 and 6 are perspective views of the exemplary dash cover removed from the vehicle.
Figure 6:
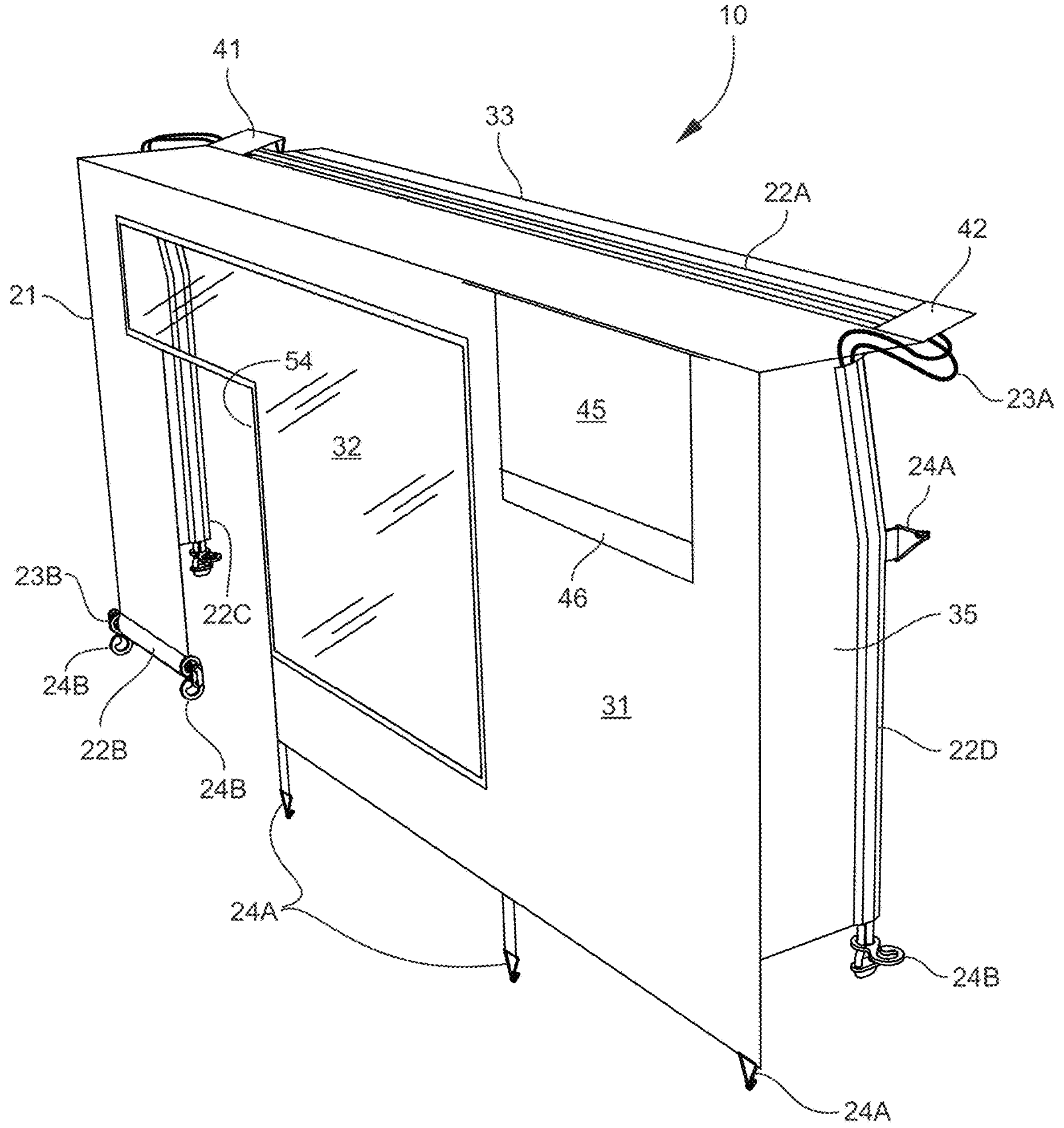
Figure 7:
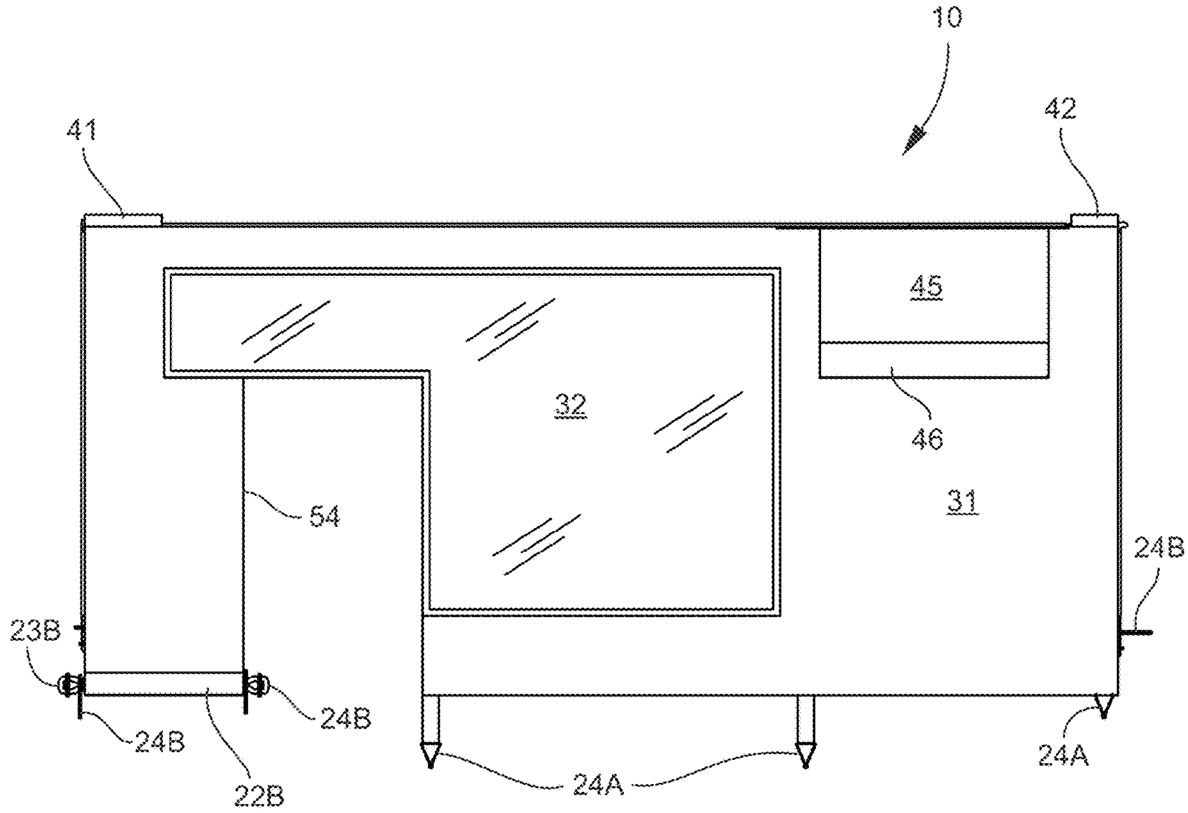
FIG. 7 is a front view of the exemplary dash cover assembly.
Figure 8:
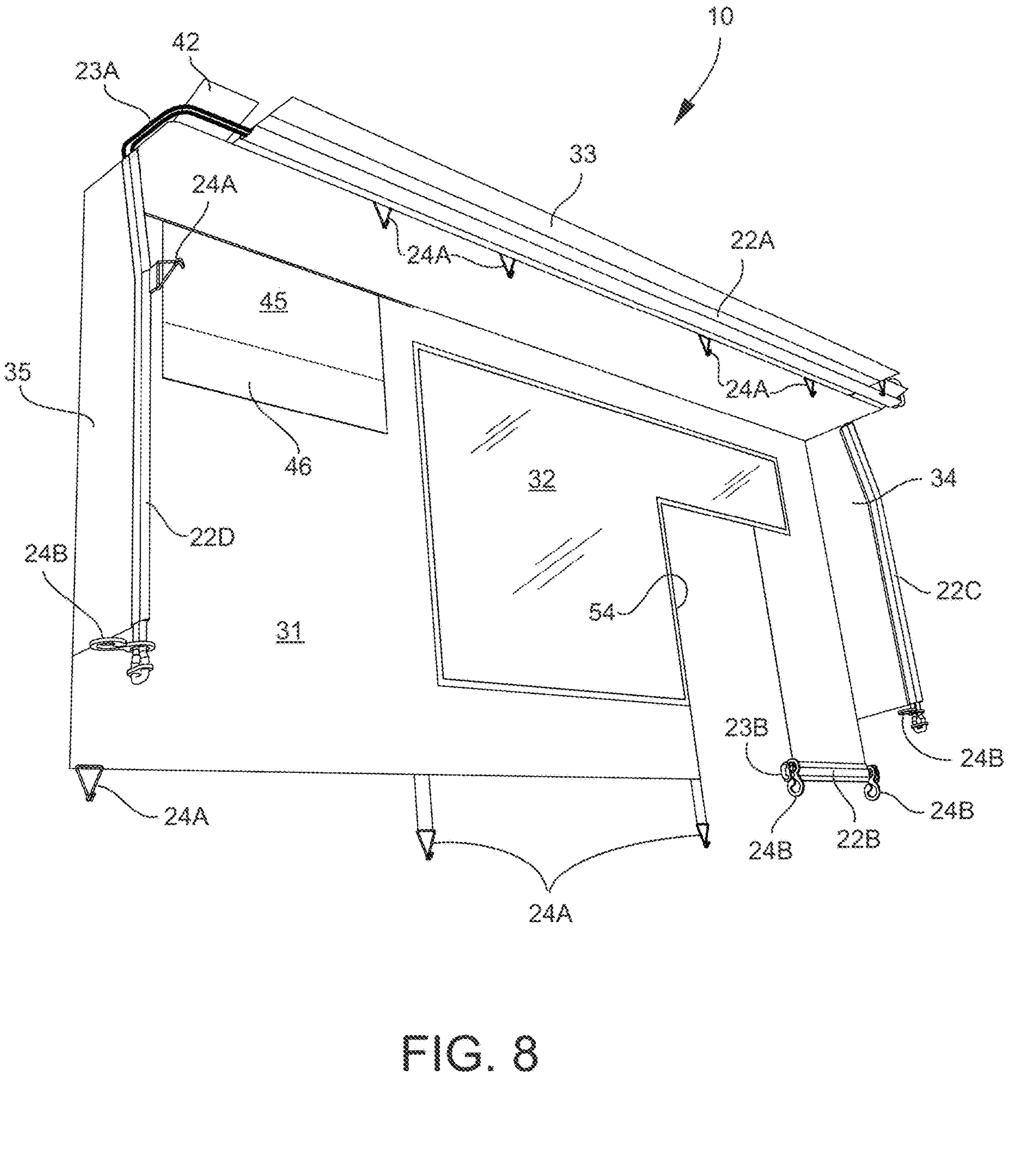
FIG. 8 is a rear perspective view of the exemplary dash cover assembly.

Referring to FIGS. 3-8, the exemplary dash cover assembly 10 incorporates an unfitted (e.g., loosely fitted) waterproof flexible cover 21. The flexible cover 21 comprises perimeter sleeves 22A, 22B, 22C, 22D for receiving bungee cords 23A, 23B, and a number of spaced apart fasteners clips 24A, 24B designed to engage various parts of the vehicle 11 on and surrounding the dashboard 12. The bungee cords 23A, 23B and fastener clips 24A, 24B cooperate to releasably hold the dash cover assembly 10 in position over the vehicle dash 12, and to ensure a snug and secure fit without any gaps or loose areas. In other exemplary embodiments, the dash cover assembly 10 may be precisely custom-fitted to the vehicle dashboard 12 and tightly secured without the use of bungee cords and/or fastener clips. The flexible cover 21 comprises a front cover section 31, transparent cover inset 32, a top cover section 33, and opposing side cover sections 34, 35—all sections 31, 33, 34, 35 being joined together (e.g., by sewing or fabric welding) into a single integrated unit. The top cover section 33 has end flaps 41, 42 configured to align with and accommodate the dash top-mounted speakers 17, 18 of the vehicle 11. The front cover section 31 has top and bottom airbag release flaps 45, 46; the top flap 45 slightly overlapping the bottom flap 46 on an outside of the dash cover assembly 10. The top and bottom flaps 45, 46 cooperate to loosely cover a square opening 48 in the cover assembly 10 configured to align with the passenger side safety airbag 19 of the vehicle 11, such that the flaps 45, 46 are freely opened from a dash-side of the vehicle 11 to avoid interfering with deployment of the airbag 19 in the event of a crash. The transparent cover inset 32 described further below may be removably attached to the front cover section 31 using complementary fasteners 51, 52, such as mating hoop and loop edge strips located at sides A, B, C, D and E of the inset 32, as shown in FIG. 5. In exemplary embodiments, the transparent cover inset 32 is readily removed from the dash cover assembly 10 for cleaning and periodically exchanged with a new inset.

The transparent cover inset 32 resides directly adjacent the front cover section 31 and cooperates with the front cover section 31 form a steering column cutout 54. The cutout 54 is configured to accommodate a steering column of the vehicle 11. The transparent cover inset 32 is configured to substantially align with the instrument panel 14 and automotive head unit 15 of the vehicle 11, such that the transparent cover inset 32 allows a driver to readily view the instrument panel 14 and to view and interface with controls of the automotive head unit 15 while driving. In one exemplary embodiment, the transparent cover inset 32 is fabricated of an 8-gauge, water-repellant marine vinyl incorporating an antimicrobial, flame retardant finish and UV inhibitor. One commercial example of such material is that manufactured by TVF, Inc. of Carmel, Indiana and sold under the brand name SunMaster®. Each of the exemplary cover sections 31, 33, 34, 35 are substantially translucent or opaque, and are fabricated of a breathable lightweight light-colored and heat-reflective nylon or vinyl laminated polyester. This fabric provides infrared shielding and may reflect up to 90% of radiant heat at the dashboard 12 of the vehicle 11. The cover sections 31, 33, 34, 35 may have a fabric thickness between 4 and 40 gauge, and may be fabricated in a variety of different colors.

In one exemplary embodiment, the entire dash cover assembly 10 may be packaged for sale and transport inside a convenient fabric carry case. When the dash cover assembly 10 is installed, the empty carry case may be used to cover a center console of the vehicle 11 between the driver and passenger seats, thereby protecting interior component of the console such as electrical outlets, car charging ports and the like. Other smaller individual covers and sleeves may be used to slide over the steering wheel, gear shift, and multi-function switches and levers on opposite side of the steering column.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A vehicle dash cover assembly for temporarily covering and protecting a dash of a vehicle, said dash cover assembly comprising:

a waterproof flexible cover comprising a transparent cover inset configured to substantially align with an instrument panel and head unit of the vehicle, such that said transparent cover inset allows a driver to readily view the instrument panel and to interface with controls of the head unit while driving, and said waterproof flexible cover further comprising a plurality of translucent cover sections directly adjacent said transparent cover inset; and means for releasably securing said waterproof flexible cover in position over the dash during operation of the vehicle.

2. The vehicle dash cover assembly according to claim 1, wherein said translucent cover sections comprise a top cover section, a front cover section, and opposing side cover sections.

3. The vehicle dash cover assembly according to claim 2, wherein said transparent cover inset resides directly adjacent said front cover section on at least 4 sides of said transparent cover inset.

4. The vehicle dash cover assembly according to claim 2, wherein said transparent cover inset is removably attached to said front cover section.

5. The vehicle dash cover assembly according to claim 2, wherein said transparent cover inset and said front cover section comprise complementary hook and loop fasteners.

6. The vehicle dash cover assembly according to claim 2, wherein said top cover section has opposing speaker flaps configured to align with respective speakers of the vehicle.

7. The vehicle dash cover assembly according to claim 2, wherein said front cover section comprises an airbag release flap configured to align with a safety airbag of the vehicle.

8. The vehicle dash cover assembly according to claim 2, wherein said front cover section and said transparent cover inset cooperate to form a steering column cutout configured to accommodate a steering column of the vehicle.

9. The vehicle dash cover assembly according to claim 1, wherein said transparent cover inset comprises a clear vinyl material incorporating a flame-retardant finish and UV inhibitor.

10. The vehicle dash cover assembly according to claim 1, wherein said means for releasably securing said waterproof flexible cover in position comprises a plurality of fasteners spaced apart along a perimeter edge of said waterproof flexible cover and adapted for engaging the vehicle adjacent the dash.

11. A vehicle dash cover assembly for temporarily covering and protecting a dash of a vehicle, said dash cover assembly comprising:

an unfitted waterproof flexible cover comprising a translucent front cover section and a transparent cover inset residing directly adjacent said translucent front cover section on at least 4 sides of said transparent cover inset, and wherein said transparent cover inset is configured to substantially align with an instrument panel and head unit of the vehicle, such that said transparent cover inset allows a driver to readily view the instrument panel and to interface with controls of the head unit while driving; and a plurality of fasteners spaced apart along a perimeter edge of said waterproof flexible cover and adapted for engaging the vehicle adjacent the dash, thereby releasably securing said waterproof flexible cover in position during operation of vehicle.

12. The vehicle dash cover assembly according to claim 11, wherein said transparent cover inset is removably attached to said translucent front cover section.

13. The vehicle dash cover assembly according to claim 12, wherein said transparent cover inset and said translucent front cover section comprise complementary hook and loop fasteners.

14. The vehicle dash cover assembly according to claim 11, wherein said waterproof flexible cover further comprises a translucent top cover section and opposing translucent side cover sections.

15. The vehicle dash cover assembly according to claim 14, wherein said translucent top cover section has opposing speaker flaps configured to align with respective speakers of the vehicle.

16. The vehicle dash cover assembly according to claim 11, wherein said translucent front cover section comprises an airbag release flap configured to align with a safety airbag of the vehicle.

17. The vehicle dash cover assembly according to claim 11, wherein said translucent front cover section and said transparent cover inset cooperate to form a steering column cutout configured to accommodate a steering column of the vehicle.

18. The vehicle dash cover assembly according to claim 11, wherein said transparent cover inset comprises a clear vinyl material incorporating a flame-retardant finish and UV inhibitor.

* * * * *